(12) United States Patent
Law et al.

(10) Patent No.: US 8,229,578 B2
(45) Date of Patent: Jul. 24, 2012

(54) METHODS AND APPARATUS TO MANAGE MODULE RUN SEQUENCES IN A PROCESS CONTROL ENVIRONMENT

(75) Inventors: Gary Law, Georgetown, TX (US); Brandon Hieb, Cedar Park, TX (US); David R. Denison, Austin, TX (US); Alper Enver, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 213 days.

(21) Appl. No.: 12/563,734

(22) Filed: Sep. 21, 2009

(65) Prior Publication Data

US 2011/0071651 A1   Mar. 24, 2011

(51) Int. Cl.
*G06F 19/00*   (2006.01)
(52) U.S. Cl. ............................. 700/23; 700/99
(58) Field of Classification Search ............ 700/23, 700/11, 18–19, 79, 121, 99; 709/221, 228; 717/121, 127
See application file for complete search history.

(56) References Cited

U.S. PATENT DOCUMENTS

| | | | | |
|---|---|---|---|---|
| 4,885,677 | A * | 12/1989 | Heilman et al. | 700/79 |
| 7,451,011 | B2 * | 11/2008 | Funk et al. | 700/121 |
| 2006/0259154 | A1 * | 11/2006 | Hood et al. | 700/2 |
| 2008/0015714 | A1 * | 1/2008 | Rudnick et al. | 700/52 |
| 2008/0082193 | A1 * | 4/2008 | Enver et al. | 700/100 |
| 2008/0249641 | A1 * | 10/2008 | Enver et al. | 700/9 |

OTHER PUBLICATIONS

United Kingdom Intellectual Property Office, office action issued in UK application No. GB1015723.8, dated Jan. 13, 2011, 5 pages.
3S-Software.Net, Integrated IEC 61131-3 Visualization, CoDeSys, www.3s-software.com, retrieved from the Internet on Jul. 31, 2009, 2 pages.
Steinhoff Automation & Fieldbus Systems, DACHSview Visual Programming-Tool for Real-Time Applications, www.steinhoff-automation.com, retrieved from the Internet on Jul. 31, 2009, 2 pages.
Deltav, Function Blocks—General Information, www.easydeltav.com, retrieved from the Internet on Aug. 6, 2009, 8 pages.
Fieldbus Foundation, Frequently Asked Questions, www.fieldbus.org, retrieved from the Internet on Jul. 31, 2009, 4 pages.
Fieldbus Foundation, Glossary, www.fieldbus.org, retrieved from the Internet on Jul. 31, 2009, 5 pages.
Deltav, Function Block Diagram Algorithms, www.easydeltav.com, retrieved from the Internet on Aug. 3, 2009, 3 pages.

(Continued)

*Primary Examiner* — Kidest Bahta
(74) *Attorney, Agent, or Firm* — Hanley, Flight & Zimmerman, LLC

(57) ABSTRACT

Example methods and apparatus to manage module run sequences in a process control environment are disclosed. A disclosed example method includes receiving a module including a plurality of function blocks, receiving an indication of a subset of the plurality of function blocks, and receiving an indication of a first sequence of execution for the subset, wherein the first sequence of execution is different than a second sequence of execution associated with the module. The example method also includes associating the subset with a run sequence identifier, and associating the run sequence identifier with a trigger condition.

19 Claims, 11 Drawing Sheets

OTHER PUBLICATIONS

ICS Triplex Isagraf Inc., IEC 61499 Function Block Model, www.isagraf.com, dated Apr. 2008, 5 pages.

Plcopen, Introduction into IEC 61131-3 Programming Languages, www.plcopen.org, retrieved from the Internet on Jul. 31, 2009, 11 pages.

Deltav, Modules—General Information, www.easydeltay.com, retrieved from the Internet on Aug. 6, 2009, 5 pages.

Steinhoff, Armin, DACHSview, a visual programming environment and target for event-driven real-time applications with IEC61499 processing, www.steinhoff-automation.com, Sep. 2003, 6 pages.

Deltav, Answers to your Questions about Implementing Fieldbus in DeltaV Systems, Emerson Process Management, dated Mar. 2007, 17 pages.

* cited by examiner

700 ⟶

TRIGGER CONFIGURATION FOR MODULE A

Trigger Settings

| | ← 702 | ← 704 | | ← 706 | | ← 708 | | ← 710 |
|---|---|---|---|---|---|---|---|---|
| Ref.: | L_STOP | Browse | Condition: | = ▼ | Value: | TRUE | Seq.: | START_STOP ▼ |
| Ref.: | L_START | Browse | Condition: | = ▼ | Value: | TRUE | Seq.: | START_STOP ▼ |
| Ref.: | D_FLOWBAD | Browse | Condition: | = ▼ | Value: | TRUE | Seq.: | INTERLOCK ▼ |
| Ref.: | D_LOOPMAN | Browse | Condition: | = ▼ | Value: | TRUE | Seq.: | INTERLOCK ▼ |
| Ref.: | PERMISSIVE | Browse | Condition: | ANY ▼ | Value: | n/a | Seq.: | MOTOR_CTRL ▼ |
| Ref.: | INTERLOCK | Browse | Condition: | ANY ▼ | Value: | n/a | Seq.: | MOTOR_CTRL ▼ |
| Ref.: | FORCE_SP | Browse | Condition: | ANY ▼ | Value: | n/a | Seq.: | MOTOR_CTRL ▼ |
| Ref.: | | Browse | Condition: | ▼ | Value: | n/a | Seq.: | ▼ |

FIG. 7

METHODS AND APPARATUS TO MANAGE MODULE RUN SEQUENCES IN A PROCESS CONTROL ENVIRONMENT

FIELD OF THE DISCLOSURE

The present disclosure relates generally to process control systems and, more particularly, to methods and apparatus to manage module run sequences in a process control environment.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, valves, valve positioners, vessels, tanks, switches and transmitters (e.g., temperature, pressure and flow rate sensors), perform functions within the process such as opening or closing valves, raising/lowering temperatures and/or pressures, and measuring process parameters. The process controller receives signals indicative of process measurements made by the field devices and/or other information pertaining to the field devices, uses this information to implement a control routine by executing one or more modules, each of which contains one or more function blocks having device instructions. Such device instructions may be executed to generate control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Process control system applications typically include process control routines in the form of modules that can be configured to perform various functions or operations in a process control system via function blocks. For example, a module may include a sequence of function blocks to control valves, motors, boilers, heaters, and/or other devices to produce a product (e.g., petroleum, cosmetics, food, etc.). The quality of the manufactured product may depend on proper function block sequencing. As a result, each product may require a unique module for each desired process control routine objective, such as maintaining product specifications within acceptable tolerances (e.g., chemical composition percentages, product viscosity, etc.). While some process control routine objectives require the full execution of the module (i.e., execution of all the function blocks of the module), other process control routine objectives may not require the full execution of the module (i.e., do not require execution of all of the function blocks of the module). Accordingly, because a portion of a module cannot be executed, numerous additional modules are often created to satisfy one or more process control routine objectives for each given product.

SUMMARY

Example apparatus and methods to manage module run sequences in a process control system are described. An example method includes receiving a module including a plurality of function blocks, receiving an indication of a subset of the plurality of function blocks, and receiving an indication of a first sequence of execution for the subset, wherein the first sequence of execution is different than a second sequence of execution associated with the module. The example method also includes associating the subset with a run sequence identifier, and associating the run sequence identifier with a trigger condition.

In accordance with another example, an example apparatus includes a run sequence manager to receive a module comprising a plurality of function blocks and a function block definer to receive an indication of a subset of the plurality of function blocks. The example apparatus also includes a schedule manager to receive an indication of a first sequence of execution for the subset, wherein the first sequence of execution for the subset different than a second sequence associated with the module, and a trigger manager to associate the subset with a run sequence identifier and a trigger condition.

BRIEF DESCRIPTION OF THE DRAWINGS

FIGS. 6 and 7 depict example user interface (UI) representations of module run sequence configurations.

DETAILED DESCRIPTION

Figure 1:
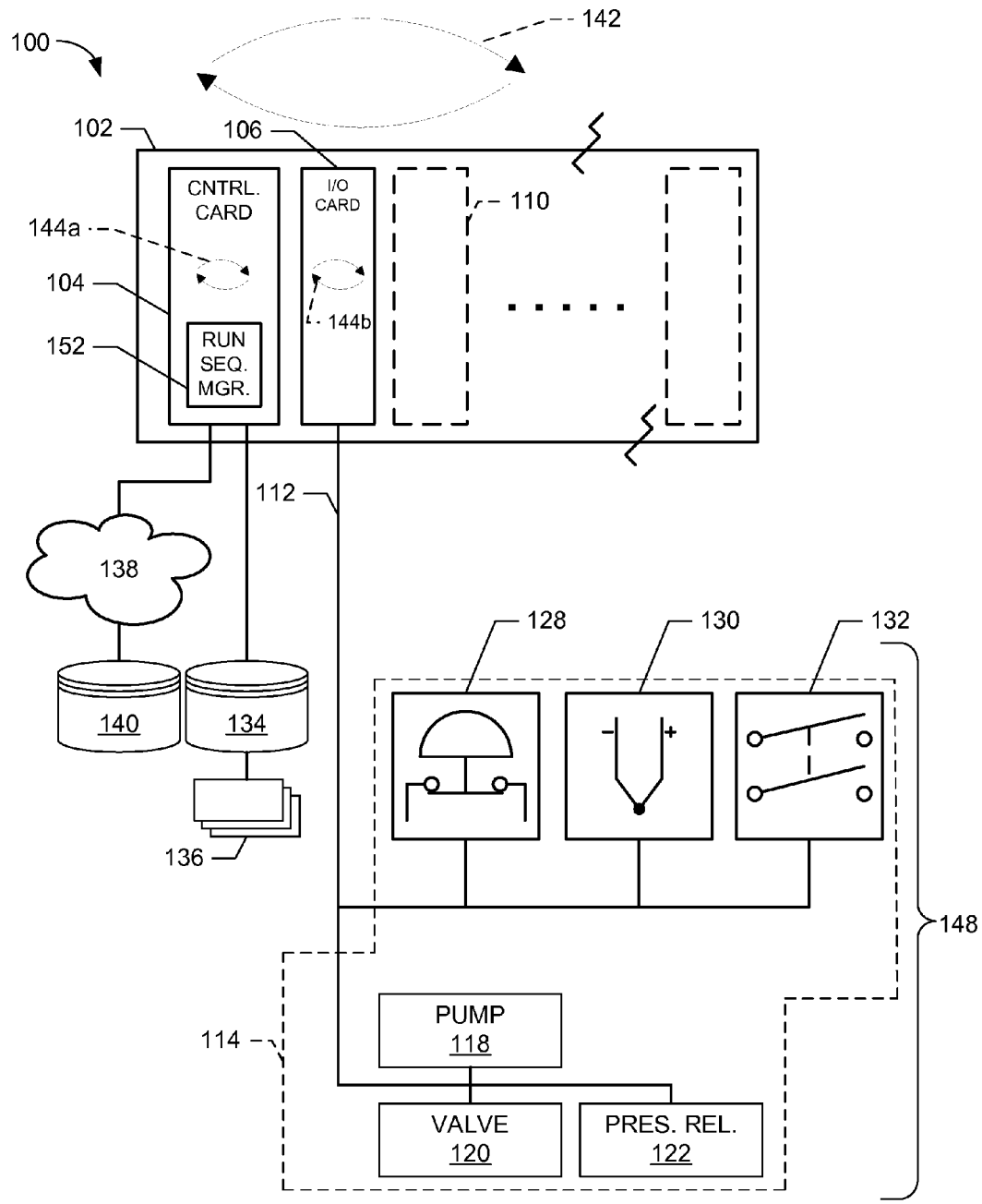
FIGS. 1 and 2 are block diagrams of example process control systems to be used when managing run sequences.

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, the examples provided are not the only way to implement such methods and apparatus.

Process control systems may be implemented on any scale, such as a relatively small process control system having a few input/output (I/O) nodes, or a relatively large number of process control systems operated in geographically disparate locations having I/O nodes, pump controls/sensors, valve controls/sensors, alarms, etc. Each process control system typically has a controller, such as a DeltaV™ controller sold by Fisher-Rosemount Systems, Inc., an Emerson Process Management™ company. The controller may retrieve and/or otherwise receive instructions to execute one or more modules containing process function blocks. Modules may contain any number of process function blocks to control a batch operation (e.g., chemical/food processing), control an assembly operation (e.g., material stamping operation(s)) and/or facilitate test and measurement audit(s) on manufactured components. Each module operates as a container of function blocks that executes in the controller on a periodic basis. Such modules allow a user of a control system to develop a control strategy to meet one or more process objectives (e.g., batch processes, manufacturing processes, testing processes, etc.), and the modules may be re-used by the control system and/or distributed to one or more other control system(s) as needed. Re-use of modules may be particularly helpful for control system sequences that repeat at predictable intervals, such as pre-process operations (e.g., one or more factory operations to prepare manufacturing equipment for production) and shut-down operations (e.g., one or more factory operations to prepare manufacturing equipment for down-time during non-shift hours). In effect, the use of modules minimizes programming efforts by the user when implementing control strategies within the control system.

In one example, a module includes a combination of function blocks to prepare a control system and/or aspects of the control system for operation, such as a cold-boot (pre-process operations) at the beginning of a manufacturing shift. In some examples, manufacturing and/or batch processes of the control environment include start-up sequences to prepare equipment for operation such as, but not limited to, pre-heating ovens (e.g., preparing ovens for electronics burn-in tests), pre-heating chemical mixing tanks, flushing batch pipes with cleaner, priming pumps, etc. Modules include corresponding function blocks, each having a designated order of operation through a sequence. Upon completion of module execution, the module may be re-executed for any number of iterations and/or alternate modules may be executed that correspond with other control system needs, such as run-time batch production process(es). For each instance in which a module executes, all of the function blocks associated with the module also execute, regardless of whether or not they are needed.

Alternate modules may be created and/or otherwise programmed by the user to satisfy one or more alternate process control objectives. Alternate start-up sequences may be required based on weather conditions, such as, but not limited to relatively high humidity, relatively cold temperatures, and/or relatively warm temperatures. For example, during winter months, factory equipment may reach relatively low temperatures during shift down-times (e.g., overnight), thereby requiring greater amounts of pre-heating time before one or more batch processes can be performed the next day. In another example, during relatively humid periods, condensation may form on and/or within the factory equipment (e.g., within batch process pipes), thereby requiring greater volumes and/or concentrations of cleaning fluid flushing operation(s) before one or more batch processes can be performed. To accommodate for such varying conditions, the user of the control system typically creates and/or otherwise programs modules unique to a given scenario. In the event that the difference between a normal start-up operation and an alternate start-up operation is, for example, a few additional seconds of heating time to burn-off excess condensation, then the user must typically build another module with one or more function blocks associated with the alternate control activity.

Generally speaking, modules are contained control strategies composed of any number of function blocks. The function blocks (FBs) are not independently accessible for execution apart from the module. Instead, the FBs may be run or executed periodically and in a sequence defined by the module (e.g., FB-1 executes, then FB-2, then FB-3, etc.). Thus, even though the operational differences between a normal start-up module and a module specific to high humidity conditions is minimal, separate modules having somewhat different FBs are typically used to provide such minimal differences in the start-up operation(s). As a result, a user may need to develop and/or build a relatively large number of separate, differently configured modules to accommodate the possible range of control system conditions (e.g., warm temperatures, cold temperatures, humid conditions, etc.).

Further, in some instances, each module to be executed in a process control system (e.g., a factory, a batch making facility, a test lab, an audit station, etc.) must be validated before it is authorized for use in the control system. For example, some pharmaceutical companies impose strict validation procedures to ensure that modules include error-free function block logic and/or require verification that all function block inputs/outputs are properly configured. Federal, state and/or local laws may also require conformance to validated control system safeguards in view of policies related to public safety (e.g., guidelines proffered by the U.S. Food and Drug Administration). As such, creating one or more new/additional modules for relatively minor process control variations may result in exhaustive, expensive validation procedures and/or testing. Only after such validation procedures have been successfully completed may the modules be distributed to a control system for execution, thereby imposing significant implementation delays. Additionally, the inability to conditionally execute (e.g., event-based execution, periodic triggers, etc.) one or more portions of the module restricts execution efficiency.

In contrast to known uses of modules and FBs, the methods and apparatus described herein enable, in part, the use of module run sequences that allow a subset of FBs within a module to execute. As used herein, the term "module run sequence(s)" refers to a set of function blocks within a module that are to be executed in response to a given execution request of the module. In other words, a module run sequence does not restrict or require the execution of all FBs within the module but, rather, enables only those FBs that are appropriate or needed at a particular time given conditions with a process control system to be executed. Through the use of module run sequences, a module may execute with a sub set of function blocks in response to a given condition (e.g., event driven triggers, periodic triggers, etc.). Module run sequences may be employed in environments that include events in which the process control system must react in a relatively fast manner (e.g., emergency shut-down, flood response, safety interlock, etc.). In other process control environments that employ a schedule-based communication bus protocol (e.g., Fieldbus™, etc.), module run sequences may be used in a manner synchronous with the schedule (e.g., synchronous with a segment macrocycle). Additionally, in the event of an alternate or different condition (e.g., an alternate event, a separate period in a timing sequence, etc.), module run sequences enable an alternate or different sub set of function blocks may be executed by the same module. Enabling such a use of the one or more alternate or different module run sequences of each module in a control system can provide a substantial reduction in the overall number of modules that need to be developed and that require exhaustive validation before the modules are permitted to be executed by the control system.

Now turning to FIG. 1, an example process control system 100 that may be employed to implement the example methods and apparatus described herein includes a controller chassis 102 having a number of slots to hold card devices. The example controller chassis 102 of FIG. 1 includes a controller card or controller 104, an input/output (I/O) card 106 and may include one or more spare slots 110 depending on the size of the controller chassis 102. The I/O card 106 and corresponding data bus 112 facilitate control for industrial systems, such as manufacturing plants, testing laboratories, and/or batch manufacturing facilities. Generally speaking, any type of control protocol and/or equipment (e.g., smart devices, standard transducer devices, etc.) may be employed with the methods and apparatus described herein. Further, while the illustrated example of FIG. 1 is described in connection with a manufacturing environment, the example methods and apparatus described herein may be employed in any environment in which process control systems, data collection systems and/or test and measurement (T&M) systems are employed.

The example data bus 112 is communicatively connected to devices 114 including a pump 118, a valve 120, a release valve 122, an emergency stop (E-Stop) switch 128, a thermocouple 130, and an interlock switch 132 (e.g., a switch to indicate nominal process operation or abnormal operation). Any number of devices 114 may be connected to the data bus 112. The controller 104 may perform one or more process control routines that have been configured and/or designed by a plant manager, a process-control engineer, a system engineer, a configuration engineer and/or any other personnel responsible for operation of the process control system 100. The controller 104 of FIG. 1 may be, for example, a DeltaV™ controller sold by Fisher-Rosemount Systems, Inc., an Emerson Process Management™ company. However, any other controller and/or controller card could be used instead. Further, while only one controller 104 is shown in FIG. 1, additional controllers of any type or combination of types may operate in the example controller chassis 102 and/or be coupled to the control system 100. The example controller 104 is communicatively connected to a runtime database 134 that stores one or more modules 136 (e.g., as computer or processor readable and executable instructions), however the runtime database 134 may be included in the example controller 104, without limitation.

In operation, the example controller 104 operates in accordance with a runtime schedule, which identifies and executes one or more modules (and corresponding FBs contained therein) necessary for desired control system functionality. Additionally, the example controller 104 is communicatively connected to a network 138 (e.g., an intranet, the Internet, etc.), which may be further communicatively connected to a configuration database 140. The example modules 136 may also be stored in the configuration database 140 so that they may be distributed to any number of alternate control systems. Additionally, in the event that the runtime database 134 becomes corrupted and/or otherwise unable to provide modules to the controller 104, information related to modules 136 and the FBs therein may be retrieved from the configuration database 140.

In operation, the example controller chassis 102 executes a chassis bus scan cycle 142 in which every card device in a populated slot of the chassis 102 has the ability to communicate on a backplane of the chassis 102. During execution of a process control routine (e.g., a module having one or more function blocks), the controller 104 may exchange information (e.g., commands, configuration information, measurement information, status information, etc.) with the field devices 114. Additionally, each card device in the controller chassis 102 executes on a respective card scan cycle 144a-b when performing one or more tasks (e.g., measuring inputs, invoking outputs, receiving data, calculating set points, marshalling communication privileges of devices on the bus(es), orchestrating batch processes, a phase of the batch process, a plurality of batch processes to make a product, etc.). The card scan cycles 144a-b may be asynchronous relative to each other because, for example, some card devices may require relatively faster scan cycles, such as the scan cycle 144b of the example I/O card 106 to process inputs from safety equipment (e.g., the E-stop 128). The example devices 114 execute according to the scan cycle 144b, which is an amount of time for each device in a device group 148 to have an opportunity to execute and communicate on the data bus 112. The scan cycle 144b duration may be a function of the number and type of devices within the scan device group 148, or may be interrupted if the particular communication protocol accommodates a communication interrupt.

The field devices 114 operate and/or are processed on an interval synchronous with the card scan cycle 144b of the example I/O card 106. As a result, in the event of an emergency condition associated with the pump 118 invoked by, for example, an operator pressing the E-stop button 128, one or more control commands to shut-down the pump 118 occur based on the next executed scan cycle 144b. In some examples, modules executing in the controller 104 have relatively slow cycle rates such that module execution times update devices 114 at relatively slow intervals (e.g., once every 5 seconds). By contrast, emergency conditions typically require relatively fast response times (e.g., milliseconds) to minimize the potential for personal and/or property damage. Continuing with the aforementioned example, to ensure that the example pump 118 stops operating soon after the E-stop button 128 is pressed by the operator, hard wired relays may be configured to electrically disengage power to the pump 118 rather than rely on the relatively slow module execution rate to process a stop command to the pump 118. While hard wired relays enable a responsive (e.g., quick) way to disengage the pump 118, installation of hard wired relays and/or cabling results in added installation costs and may require too much space in some control system environments.

In the illustrated example of FIG. 1, a module run sequence manager 152 executes in the controller 104. In operation, the example module run sequence manager 152 monitors for one or more triggers (e.g., event-based triggers, periodic triggers, sequential triggers, etc.) and invokes a module run sequence associated with the trigger. Unlike known systems that execute one or more modules by executing all FBs contained therein pursuant to a predetermined sequence, the example module run sequence invoked by the module run sequence manager 152 invokes one or more specific FBs of the modules to execute in an order based on a generated schedule. In effect, a request to execute a module based on a module run sequence directive causes the module to execute only selected FBs of interest (e.g., a subset of FBs) associated with the trigger condition(s) and prevent any remaining FBs of the module from executing. In other words, the module run sequence specifies conditional execution of the module and improves execution efficiency of a process by limiting FB execution to only such FBs that are needed. Additionally, rather than rely upon the periodic nature of the module (e.g., execution occurring only once per 5 seconds), the module run sequence can designate some FBs to execute in a periodic manner, while designating other FBs to execute based on one or more triggers (e.g., event-based execution). While the illustrated example of FIG. 1 describes standard I/O field devices 114, the methods and apparatus described herein are not limited thereto. Additionally or alternatively, the methods and apparatus described herein may employ standard I/O field devices, transducers, smart devices and/or any combination thereof.

Figure 2:
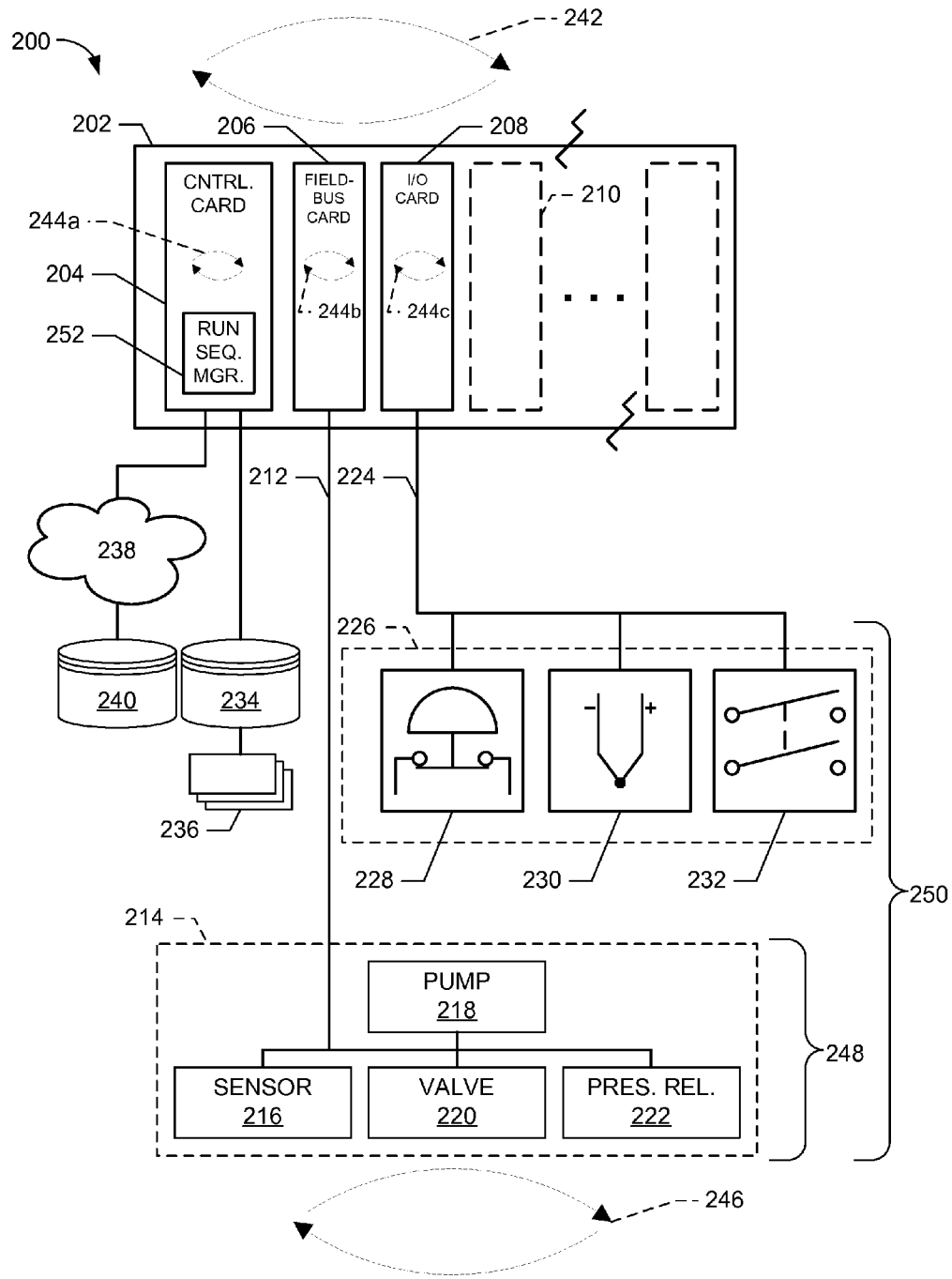

FIG. 2 illustrates another example process control system 200 similar to the example process control system 100 of FIG. 1. In the illustrated example of FIG. 2, the process control system 200 employs a schedule-based communication bus protocol, such as Foundation Fieldbus™ (hereinafter Fieldbus™). Segments within a Fieldbus™ environment marshal control device communication and/or execution pursuant to a link active scheduler (LAS) in which a macrocycle defines a duration for communicating with every device on the segment. The example process control system 200 includes a controller chassis 202 having a number of slots to hold card devices, which further includes an example controller card or controller 204, a Fieldbus™ card 206, an I/O card 208, and any number of spare slots 210 depending on the size of the controller chassis 202. The Fieldbus™ card 206 and corresponding data bus 212 facilitate distributed control for industrial systems in a synchronized manner where each device receives a scheduled moment for bus 212 communication. While the illustrated example of FIG. 2 includes examples related to the Fieldbus™ protocol, such as the Fieldbus™ card 206 and corresponding Fieldbus™ devices 214, the methods and apparatus described herein are not limited thereto.

The example data bus 212 is communicatively connected to Fieldbus™ devices 214 including a sensor 216, a pump 218, a valve 220, and a release valve 222. Any number of Fieldbus™ devices 214 may be connected to the data bus 212, which is sometimes referred to as a segment bus 248. Each Fieldbus™ device 214 is capable of executing control logic, such as FBs contained within one or more modules. Fieldbus™ devices 214 are also sometimes referred to as smart devices based on their on-board processors, memory, ease of configuration and/or ability to execute FB logic (e.g., alarm(s), proportional-integral-derivative (PID) routine(s), set point(s), etc.). The example release valve 222 may, for example, include an on-board PID controller or module to regulate a valve position to control a flow rate, thereby relieving the controller 204 of the responsibility to increase its scan rate of the release valve 222. In operation, the controller 204 executes a module and publishes data on one or more linked FBs.

An example I/O bus 224 is communicatively connected from the I/O card 208 to any number of standard I/O devices 226. In the illustrated example of FIG. 2, the standard I/O devices 226 include an emergency stop switch (E-stop) 228, a thermocouple 230 and an interlock switch 232 (e.g., a switch to indicate nominal process operation or abnormal operation). Generally speaking, standard I/O devices 226 do not include on-board logic, memory and/or an ability to execute logic (e.g., function blocks). The standard I/O devices 226 may include relatively simple equipment including, but not limited to transducers, switches, valves, indicator lights, light curtains and/or audible alarms. However, module run sequences permit the user to integrate event-based logic and/or periodic events with any type of industrial device, such as a smart device (e.g., a Fieldbus™ device) or a standard I/O device. Additionally, the methods and apparatus described herein are not limited to the Fieldbus™ protocol and/or Fieldbus™ devices. Rather, field devices may include, without limitation, Profibus™ devices and/or HART-compliant devices that communicate via the bus 212 via Profibus™ and/or HART protocol(s).

The controller 204 may perform one or more process control routines that have been configured and/or designed by the plant manager, the process-control engineer, the system engineer, the configuration engineer and/or any other personnel responsible for operation of the process control system 200.

Similar to the control system 100 of FIG. 1, the controller 204 of FIG. 2 may be the DeltaV™ controller. However, any other controller and/or controller card could be used instead. Further, while only one controller 204 is shown in FIG. 2, additional controllers of any type or combination of types may operate in the example controller chassis 202 and/or be coupled to the control system 200. The example controller 204 is communicatively connected to a runtime database 234 that stores one or more modules 236 (e.g., as computer or processor readable and executable instructions), however the runtime database 234 may be included in the example controller 204, without limitation. Similar to FIG. 1, the example controller 204 of FIG. 2 operates in accordance with a runtime schedule, which identifies one or more modules necessary for desired control system functionality. However, the module run sequences are synchronized with an example macrocycle 246, as described further below. Additionally, the example controller 204 is communicatively connected to a network 238 (e.g., an intranet, the Internet, etc.), which may be further communicatively connected to a configuration database 240. The example modules 236 may also be stored in the configuration database 240 so that they may be distributed to any number of alternate control systems. Additionally, in the event that the runtime database 234 becomes corrupted and/or otherwise unable to provide modules to the controller 204, information related to modules 236 and the FBs therein may be retrieved from the configuration database 240.

In operation, the example controller chassis 202 executes a chassis bus scan cycle 242 in which every card device in a populated slot of the chassis 202 has the ability to communicate on a backplane of the chassis 202. During execution of a process control routine (e.g., a module having one or more function blocks), the controller 204 may exchange information (e.g., commands, configuration information, measurement information, status information, etc.) with the field devices 214 and/or 226. Additionally, each card device in the controller chassis 202 executes on a respective card scan cycle 244a-c when performing one or more tasks (e.g., measuring inputs, invoking outputs, receiving data, calculating set points, marshalling communication privileges of devices on the bus(es), orchestrating batch processes, a phase of the batch process, a plurality of batch processes to make a product, etc.). The card scan cycles 244a-c may be asynchronous relative to each other because, for example, some card devices may require relatively faster scan cycles. The example Fieldbus™ devices 214 execute according to a macrocycle 246, which is an amount of time for each Fieldbus™ device 214 on a Fieldbus™ segment 248 to have an opportunity to execute and communicate on the data bus 212. The macrocycle 246 duration is a function of the number and type of devices on the Fieldbus™ segment 248 and is marshaled by a scheduler in the example Fieldbus™ card 206 (e.g., the LAS). A global device pool 250 includes devices operating on the Fieldbus™ segment 248, as well as the standard I/O devices 226.

The standard I/O devices 226 operate and/or are processed on an interval synchronous with the card scan cycle 244c of the example I/O card 208, but the card scan cycle 244c is asynchronous relative to the example macrocycle 246. To integrate Fieldbus™ devices (or any other schedule-based communication protocol) and non-Fieldbus™ devices with one or more module run sequences, the example run sequences are integrated with the macrocycle 246 that corresponds to all of the control devices associated therewith. In other words, the example module run sequence will invoke one or more FBs to execute in a manner synchronous with the macrocycle 246.

In the illustrated example of FIG. 2, a module run sequence manager 252 executes in the controller 204. In operation, the example module run sequence manager 252 monitors for a periodic and/or sequential trigger and invokes a module run sequence associated with the trigger. As described above in view of FIG. 1, unlike known systems that execute one or more modules by executing all FBs contained therein pursuant to a predetermined sequence, the example module run sequence invoked by the module run sequence manager 252 invokes one or more specific FBs of the modules to execute in an order based on a generated schedule. Only the selected FBs of interest (e.g., a subset of FBs) associated with the periodic and/or sequential trigger and prevents any remaining FBs of the module from executing. Additionally, the example run sequence manager 252 coordinates with the macrocycle 246 that may be specific to the type of schedule-based communication protocol being used by the example process control system 200 (e.g., Fieldbus™).

Figure 3:
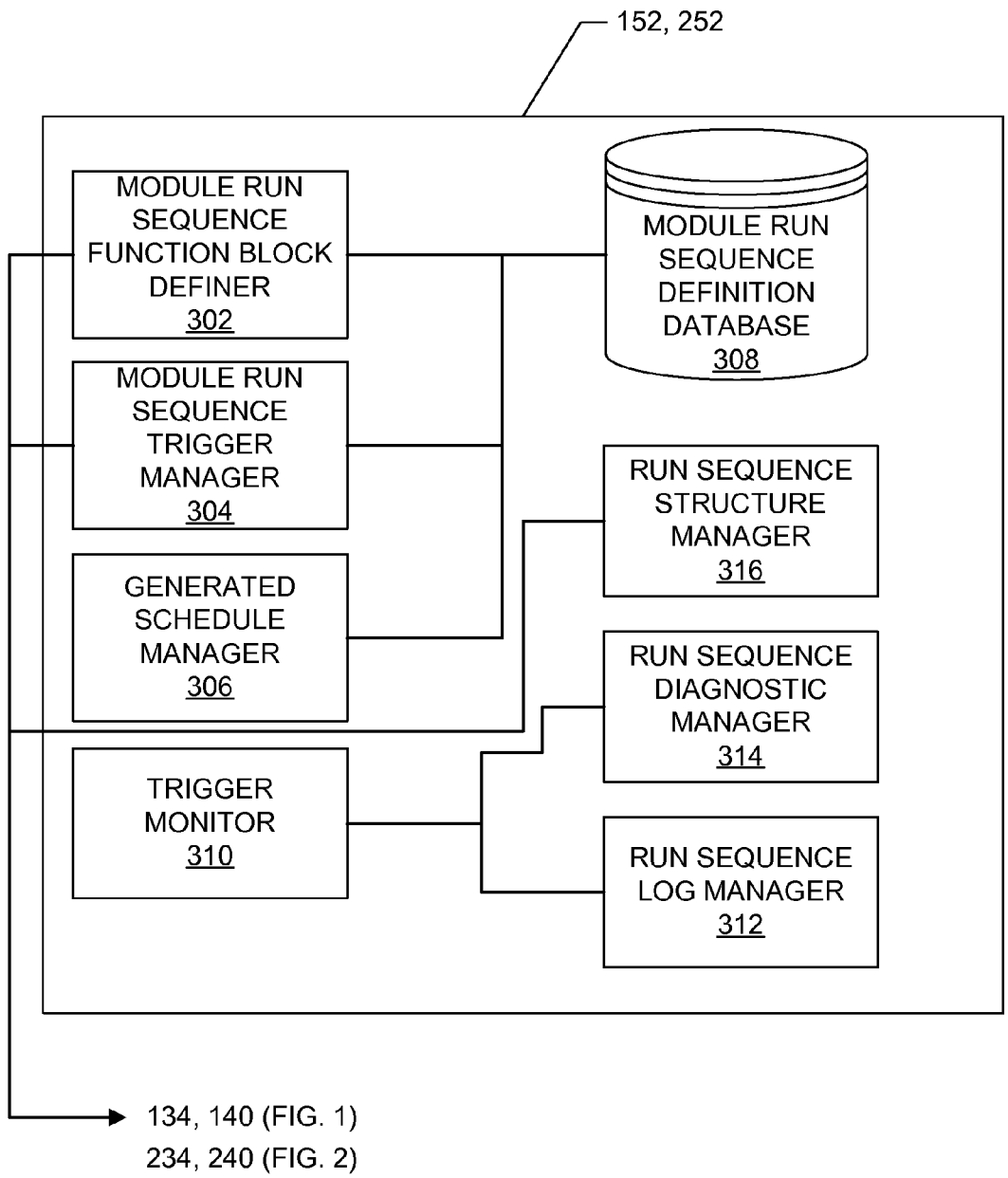
FIG. 3 is a block diagram of an example module run sequence manager shown in FIGS. 1 and 2.

In the illustrated example of FIG. 3, the module run sequence manager 152, 252 includes a module run sequence FB definer 302, a module run sequence trigger manager 304, and a generated schedule manager 306, all of which are communicatively connected to a module run sequence definition database 308. The example module run sequence FB definer 302 and the example module run sequence trigger manager 304 are also communicatively connected to the example runtime database 134, 234 and/or the example configuration database 140, 240 of FIGS. 1 and 2 to retrieve information related to available modules, FBs within each module and/or information related to the devices 148, the Fieldbus™ segment 248 and/or the global device pool 250 of the example process control system 100, 200. The example module run sequence manager 152, 252 also includes a trigger monitor 310 to monitor the process control system 100, 200 for one or more trigger events (e.g., event-based triggers, periodic triggers, etc.) so that a corresponding module run sequence can be selected for execution, as described in further detail below. Additionally, the example run sequence manager 152, 252 includes a run sequence log manager 312, a run sequence diagnostic manager 314, and a run sequence structure manager 316.

Prior to monitoring for one or more triggers via the trigger monitor 310, one or more users of the example process control system 100, 200 may configure one or more module run sequences and their corresponding behavior. The example module run sequence FB definer 302 accesses one or more modules via the example runtime database 134, 234, the example configuration database 140, 240, and/or any other location in which modules are stored. FBs that make up a module selected by a user are parsed and/or otherwise identified, including corresponding properties of the FBs. For example, each FB includes a usage name, an FB icon to represent one or more capabilities of the FB, connector parameters to identify inputs and/or outputs, an execution order parameter to identify in which order the FB executes within the module, and a block scan rate parameter to identify a corresponding FB scan rate. The example module run sequence FB definer 302 allows, in part, an ability to view available FBs within the module to see if such FBs are appropriate for execution in response to a trigger event. For process control systems that do not employ a schedule-based communication protocol, such as the example process control system 100 of FIG. 1, trigger event(s) may be associated with one or more FBs via the example module run sequence trigger manager 304 and saved to the module run sequence definition database 308. Alternatively, for process control systems that employ a schedule-based communication protocol, such as the example process control system 200 of FIG. 2, periodic and/or synchronous trigger event(s) may be associated with one or more FBs to run synchronously with a macrocycle via the example module run sequence trigger manager 304 and saved to the module run sequence definition database 308. To allow FBs to be arranged in a desired order of execution and/or based off of one or more synchronous, periodic and/or triggered event(s), the example generated schedule manager 306 facilitates, in part, a modified order of FB execution (a module run sequence schedule) to be defined, as described in further detail below.

During operation of the process control system 100, 200, the example trigger monitor 310 monitors for one or more trigger event(s) (e.g., event-based triggers, periodic triggers, sequential triggers, etc.). In response to detecting a trigger event, the example trigger monitor 310 identifies a corresponding module run sequence to be invoked by querying the example module run sequence trigger manager 304. For example, the trigger may be defined by the module run sequence trigger manager 304 in the form of a lookup table having a corresponding column to identify which module run sequence to execute in response to the trigger event. Additionally, the module run sequence identified by the trigger manager 304 is further used to invoke the schedule manager 306, which references the generated schedule to identify which associated FBs to execute and in what order to execute them. Additionally or alternatively, in the event that each FB includes profile information that identifies which module run sequence with which it is associated (e.g., a mask value), then the example schedule manager 306 may not be needed in every instance.

During operation of the example trigger monitor 310, the example run sequence log manager 312 may be notified of one or more occurrences of run sequence activity. In some examples, the run sequence log manager 312 may include a list of run sequences of interest that, when invoked via an event-based trigger and/or a sequential trigger, record a log date and time. Additionally or alternatively, the example trigger monitor 310 may notify the example run sequence diagnostic manager 314 of one or more instances of run sequence activity for diagnostic purposes. In some examples, the run sequence diagnostic manager 314 may initiate a timer at the on-set of process control activity. In the event that one or more identified run sequences do not execute before the initiated timer reaches a threshold value, the example run sequence diagnostic manager 314 may issue a notification message to the user. Without limitation, the example run sequence diagnostic manager 314 may identify whether one or more predetermined run sequences and/or series of run sequences was invoked.

As the operator and/or other personnel responsible for process control operation, configuration and/or management develop module run sequences, some sequences will prove themselves out as particularly useful. In some instances, a particular module run sequence may be tested in any number of varying conditions and demonstrate a degree of usefulness that may be implemented in other aspects of a control system, such as the example process control systems 100, 200. When a module run sequence is identified by process control personnel as particularly useful, the example run sequence structure manager 316 may be employed to encapsulate one or more module run sequences as a composite structure for reuse in one or more additional and/or alternate process control systems. The composite structures allow personnel to design and/or implement module run sequences that are consistent across one or more plant environments, and may reduce efforts related to configuration. Personnel may design new composite structures via, for example, graphical user interfaces that enable a drag-and-drop interface, and/or existing module run sequences may be identified and converted to a composite structure for distribution.

Figure 4:
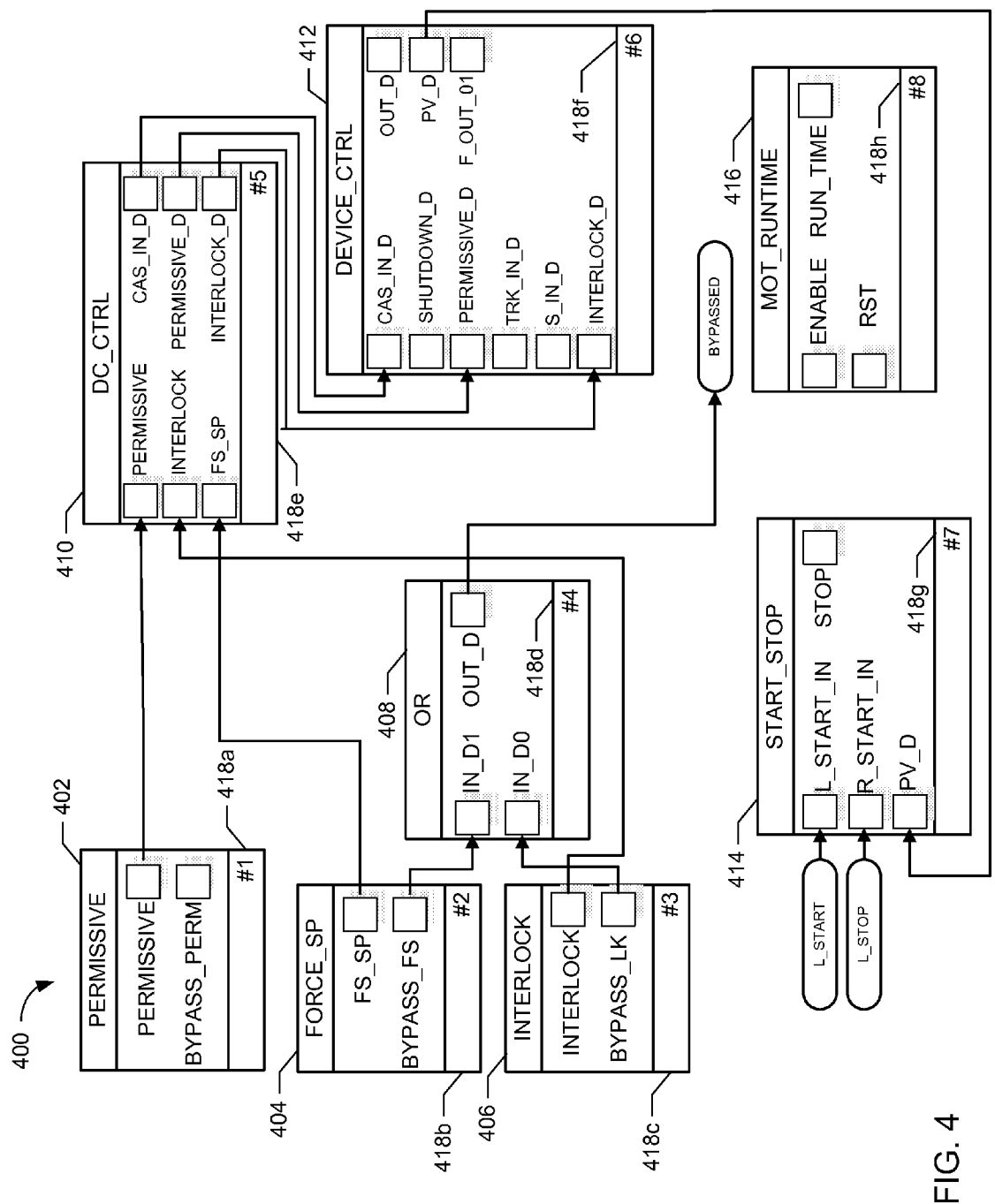
FIG. 4 is an example module that may be executed by the process control systems of FIGS. 1 and 2.

Now turning to FIG. 4, an example module 400 is shown containing eight (8) FBs. In particular, the example module 400 includes a PERMISSIVE FB 402, a FORCE_SP FB 404, an INTERLOCK FB 406, an OR FB 408, a DC_CTRL FB 410, a DEVICE_CTRL FB 412, a START_STOP FB 414, and a MOT_RUNTIME FB 416. Each of the example FBs shown in FIG. 4 also includes a corresponding execution order parameter 418a-h to identify the order in which the FB will execute within the module 400. As described above, with known systems, module execution is typically restricted to a predefined order of execution for all FBs located therein, which may result in process inefficiencies when one or more of the FBs are not needed to respond effectively to one or more triggers. To illustrate, assume that the example module 400 operates at a steady state cycle of 10 seconds and provides an output (e.g., a material output) to a subsequent process via motor activity (e.g., a motor controlled by the DEVICE_CTRL FB 412). Further assume that the subsequent process receives and measures a flow value indicative of the material output from the module 400 and operates at a steady state repeating cycle of 100 mSec. For the purpose of this example scenario, in the event that the material output from the module 400 stops, the subsequent process notifies the module via the INTERLOCK FB 406 with a shut down request and further requires that the motor (e.g., a pump) controlled by DEVICE_CTRL FB 412 be shut down within one second, otherwise process equipment will be damaged. However, due to the 10 second steady state cycle time of the module 400, the motor may not be shut down within one second.

Prior attempts to accommodate for the aforementioned example scenario included installation of independent power break relays physically wired to the motor and controlled by the subsequent process running at a relatively high scan rate. Alternatively, other attempts to accommodate for the aforementioned example scenario included configuring the module 400 to execute at a faster cycle rate (e.g., a Nyquist cycle rate of one-half second to ensure protection of the process equipment in view of the one second damage limit). Both approaches include significant expense, cumbersome implementation and, in some instances cannot be realized due to the respective size of the global segment for which a controller is responsible. For example, in situations with a few control devices (e.g., pumps, sensors, valves), decreasing a cycle rate (e.g., the example cycle 144b of FIG. 1) may be feasible, but in situations involving many more control devices, decreasing the cycle rate may not be possible.

Figure 5:
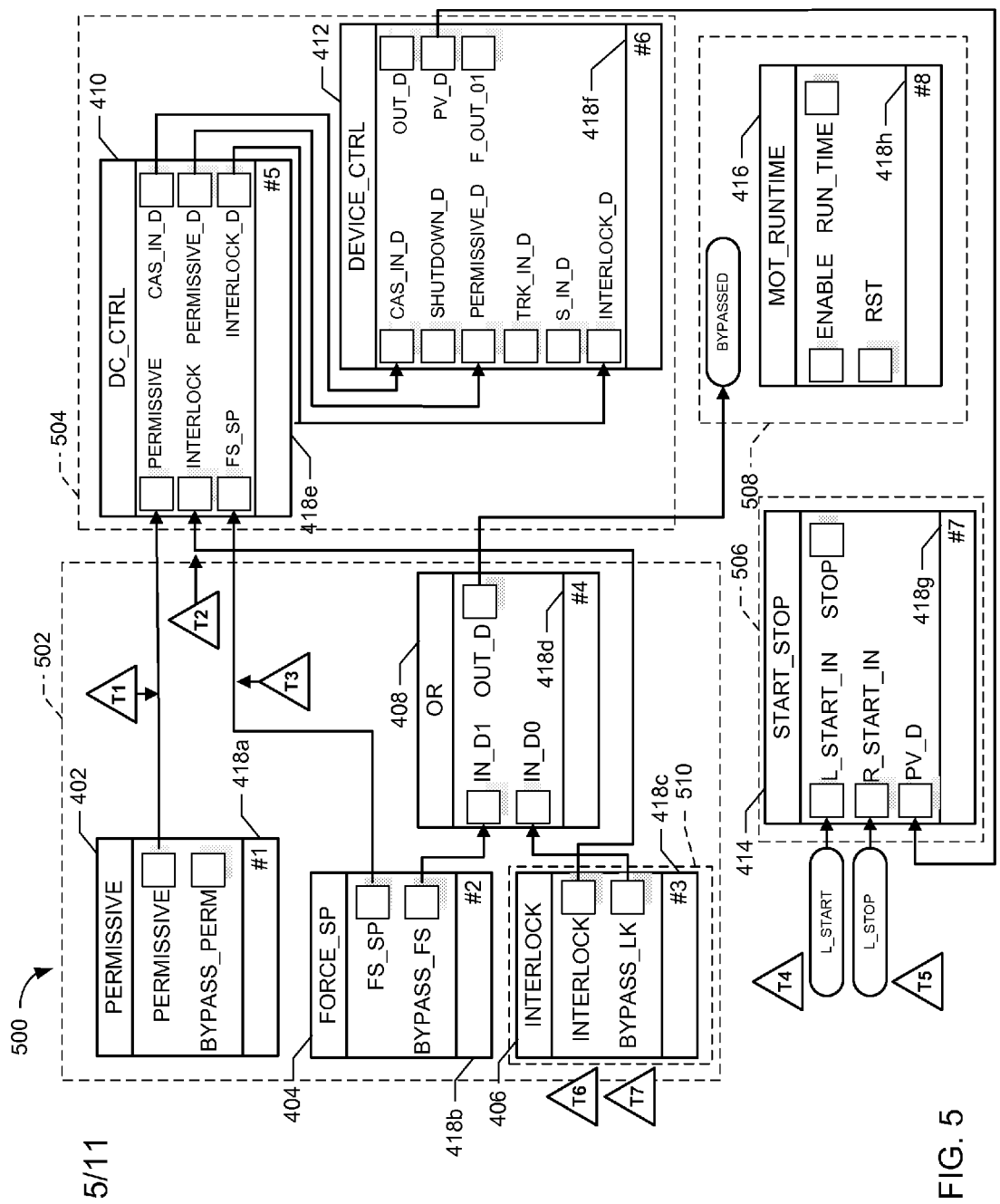
FIG. 5 is an example run sequence enabled module that may be executed by the process control systems of FIGS. 1 and 2.

In the illustrated example of FIG. 5, the example module 400 of FIG. 4 is shown as a run sequence enabled module 500 having five (5) separate module run sequences (MRSs). In particular, the example run sequence enabled module 500 includes a Monitor MRS 502, a Motor Control MRS 504, a Start/Stop MRS 506, a Maintenance MRS 508, and an Interlock MRS 510. The example run sequence enabled module 500 also includes a number of triggers T1-T7 that, when detected by the example trigger monitor 310, invoke a corresponding MRS to execute. To illustrate, in the event that T2 is invoked, then the trigger manager 304 identifies a corresponding MRS to execute which, in this case, is the Monitor MRS 502. Additionally, the trigger manager 304 queries the schedule manager 306 to identify which FB should occur and in what order. Based on identifying the Monitor MRS 502, the schedule manager 306 in this example identifies the PERMISSIVE FB 402, the FORCE_SP FB 404, the INTERLOCK FB 406 and the OR FB 408. On the other hand, in the event that T6 is invoked, such as by way of a notification signal from the subsequent process that detected a flow rate problem, then the trigger manager 304 identifies that the Interlock MRS 510 should execute.

Upon detection of a trigger in the example non-synchronous protocol based process control system 100 of FIG. 1 by the example trigger monitor 310, the example module run sequence manager 152 may invoke the function blocks to execute independently of the module's configured execution rate/period to ensure prompt action when needed. In other words, the FBs associated with the Interlock MRS 510 execute, but no other FBs within the example MRS enabled module 500 execute. As such, the execution efficiency of the run sequence enabled module 500 is improved so that it is more responsive to an emergency situation and is not limited by the 5 second execution rate that occurs during normal operation. On the other hand, upon detection of a synchronous event/trigger in the example synchronous protocol based process control system 200 of FIG. 2 by the example trigger monitor 310, the example module run sequence manager 252 may identify a corresponding macrocycle 246 that is implemented by the synchronous protocol (e.g., the Fieldbus™ macrocycle for segment 248). Once the macrocycle 246 is identified, the example module run sequence manager 252 implements the run sequence to operate synchronously with the segment devices 248.

Figure 6:
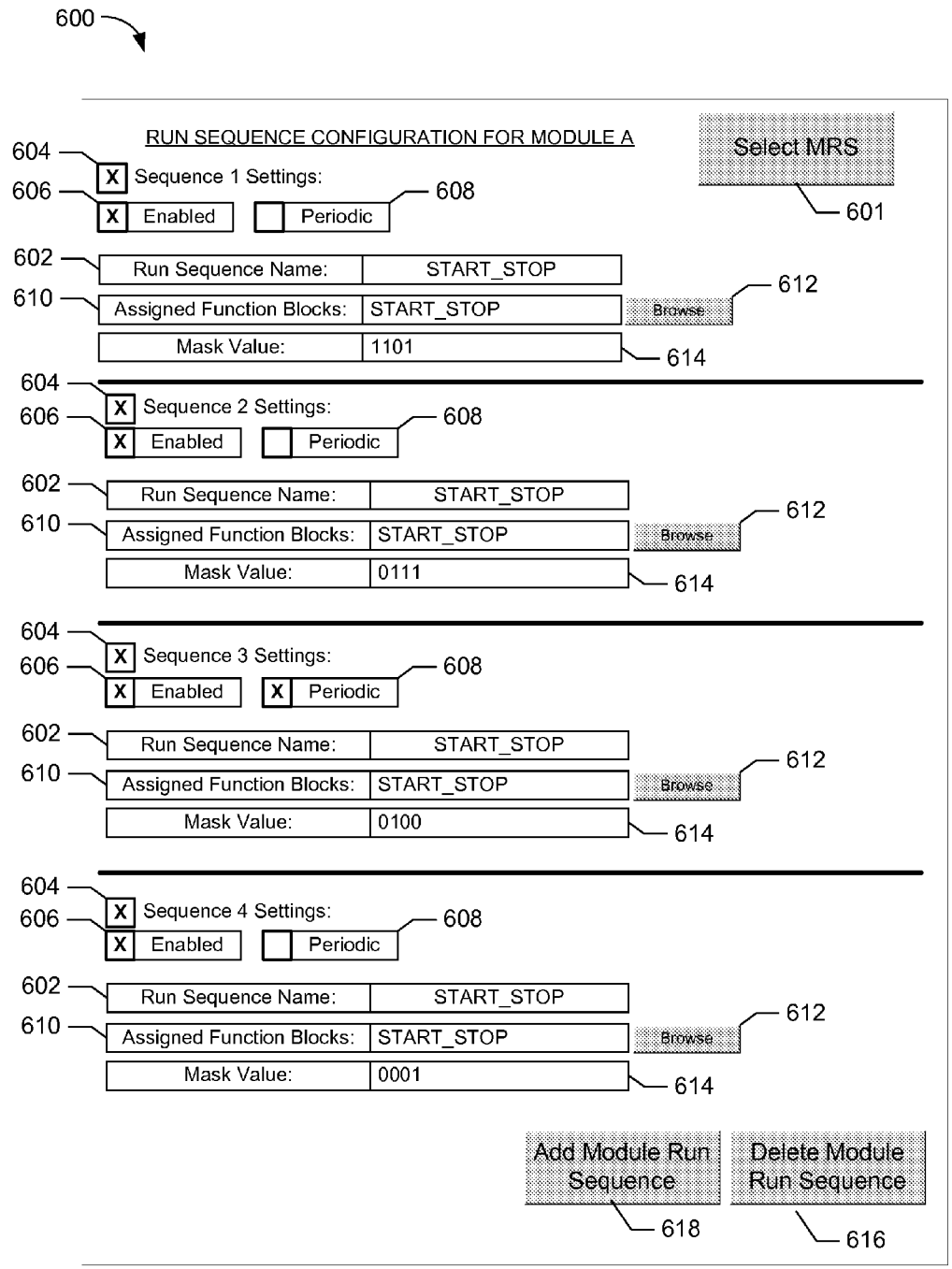

FIG. 6 illustrates an example user interface (UI) 600 (e.g., a graphical user interface, a textual interface, etc.) that may be employed to configure one or more MRSs for use with the methods and apparatus described herein. In the illustrated example of FIG. 6, the UI 600 is associated with a selected module (e.g., Module A) selected via a module select button 601 and includes sequence label fields 602 to designate MRS nomenclature, sequence selector boxes 604 to select one or more defined MRSs to delete, MRS enable selector boxes 606 to enable each corresponding MRS when checked, and periodic selector boxes 608 to identify which MRSs will execute in a periodic manner. The example UI 600 also includes a FB assignment field 610 to allow an association to be created between an MRS and one or more FBs. Selection of a browse button 612 results in a list (not shown) of all FBs contained within the module (e.g., Module A).

The example UI 600 also includes an example mask value field 614 to allow each MRS and FB to be assigned a mask value. For example, one of the FB properties may include the mask value so that when a run sequence enabled module is called, a simple binary AND operation may identify which FBs therein are designated to execute. Without limitation, the mask value assigned to each FB and/or MRS is not limited to four bits, but may be any length and assigned manually or automatically to prevent duplication. In the event that the user wishes to delete one or more configured MRSs or add one or more new MRSs, a corresponding delete MRS button 616 or an add MRS button 618.

FIG. 7 illustrates an example UI 700 that may be employed to configure one or more triggers for use with the MRSs configured in FIG. 6. In the illustrated example of FIG. 7, the UI 700 is associated with a selected module (e.g., Module A) and identifies which triggers should be monitored that, when true, invoke one or more MRSs. The example UI 700 includes a reference identification column 702 to allow an association between a reference trigger and an MRS to be created. References and/or reference triggers are inputs and/or system events such as, but not limited to signal references for I/O data, external or dynamic references to other modules and/or internal references within a module. A browse column 704 includes corresponding browse buttons to be selected that generate a list (not shown) of available reference triggers within the module, such as inputs to FBs. A condition column 706 and a value column 708 permit an association to be made between each corresponding reference trigger and a logical status. In the event that the logical status is true upon a test for equality, then a sequence column 710 identifies which MRS should be invoked. In other circumstances, any change in the reference trigger will cause a corresponding MRS to be invoked, as shown by the example sequence column 710.

As described above, the FBs that execute in response to a trigger are further specified to execute in a particular sequence based on a generated schedule. In the illustrated example of FIG. 8, a generated schedule 800 is shown having a controller timeline 802, a motor (pump) device timeline 804, a flow sensor timeline 806, and a segment timeline 808. The segment timeline 808 illustrates data that is being transmitted (published) on a bus, such as the field devices 148, the Fieldbus™ 248 and/or global device pool 250 during that period of time. The controller timeline 802 illustrates controller activity and may be where the modules and/or MRSs are executed. The Motor timeline 804 and flow sensor timeline 806 illustrate temporal activity with respect to those devices.

In operation, the example generated schedule 800 is configured to be responsive to situations in which T6 is true 810, such as situations in which the flow sensor identifies a problem. In some examples, Module A 400 of FIG. 4 may operate with a non-synchronized communication protocol at a cycle rate of once every five seconds, which exceeds a duration or response delay that could result in equipment damage. However, the example run sequence enabled module 500 of FIG. 5 responds to the trigger T6 and identifies the MRS that corresponds to T6, which in this case is the Motor Control MRS 504 (814). The example generated schedule manager 306, which may execute in a controller and/or in any process control system element having modules, determines which FBs from the module 500 to execute and in which order. Continuing with the above example, the DC_CTRL FB 410 (816) and the DEVICE_CTRL FB 412 (818) are invoked to stop the motor from running and protect the process equipment. While the above example illustrates a non-synchronized environment and an event-based trigger, an example generated schedule may also be configured in connection with synchronized triggers in a distributed control environment, such as those operating pursuant to a segment macrocycle.

While example process control systems 100 and 200 have been shown to manage MRSs, and example module run sequence managers 152, 252 have been illustrated in FIGS. 1, 2 and 3, one or more of the interfaces, data structures, elements, processes, UIs and/or devices illustrated in FIGS. 1 through 8 may be combined, divided, re-arranged, omitted, eliminated and/or implemented in any other way. Further, the example runtime database 134, 234, the configuration database 140, 240, the modules 136, 236, the module run sequence manager 152, 252, the module run sequence FB definer 302, the module run sequence trigger manager 304, the generated schedule manager 306, the module run sequence definition database 308, the example modules 136, 236, the trigger monitor 310, the run sequence log manager 312, the run sequence diagnostic manager 314 and/or the run sequence structure manager 316 of FIGS. 1, 2 and 3 may be implemented by hardware, software and/or firmware. Thus, for example, any of the example runtime database 134, 234, the configuration database 140, 240, the modules 136, 236, the module run sequence manager 152, 252, the module run sequence FB definer 302, the module run sequence trigger manager 304, the generated schedule manager 306, the module run sequence definition database 308, the trigger monitor 310, the run sequence log manager 312, the run sequence diagnostic manager 314 and/or the run sequence structure manager 316 may be implemented by one or more circuit(s), application specific integrated circuit(s) (ASIC(s)), programmable logic device(s) (PLD(s)), and/or field programmable logic device(s) (FPLD(s)), etc. Further still, the module run sequence manager 152, 252 may include interfaces, data structures, elements, processes and/or devices instead of, or in addition to, those illustrated in FIGS. 1 through 8 and/or may include more than one of any or all of the illustrated interfaces, data structures, elements, processes, UIs and/or devices.

Figure 8:
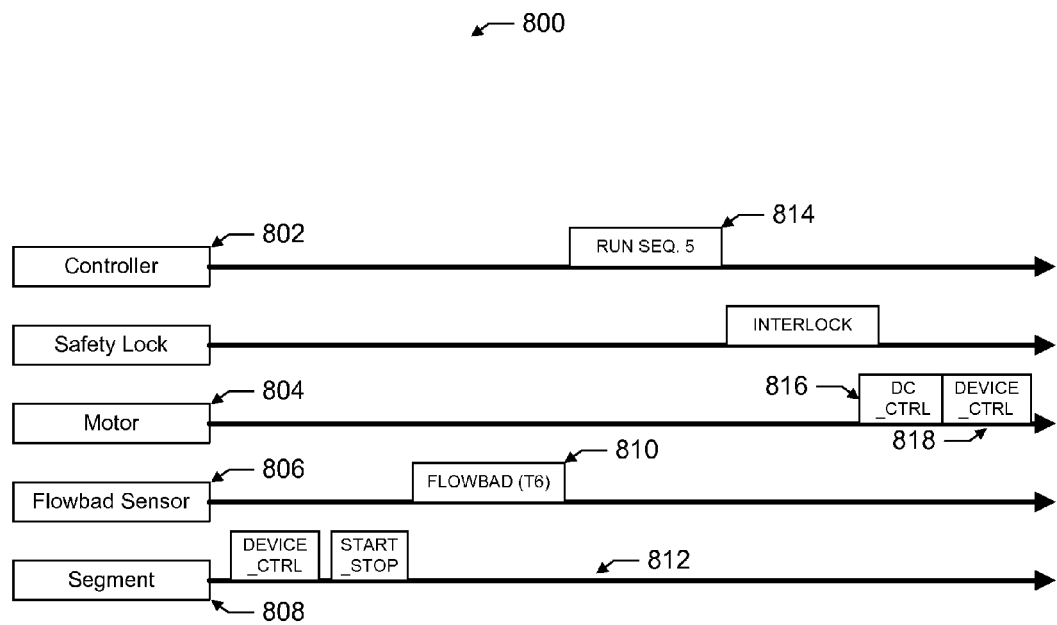
FIG. 8 is a timing diagram of an example module run sequence schedule.
Figure 9:
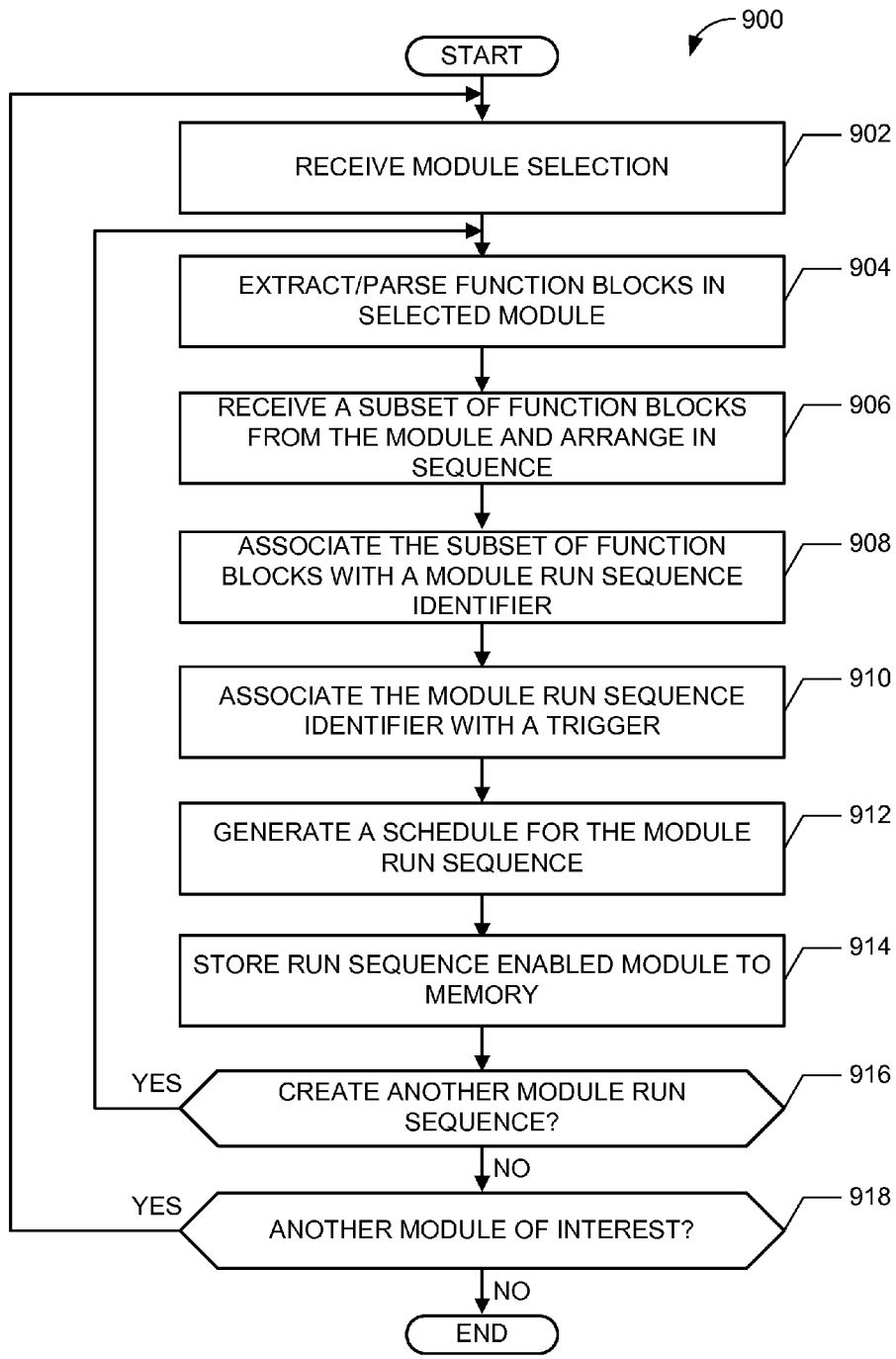
FIGS. 9 and 10 are flow diagrams of example methods that may be used to implement the example module run sequence manager, the example run sequence enabled module, example UIs, and the example module run sequence schedule of FIGS. 1-8.
Figure 10:
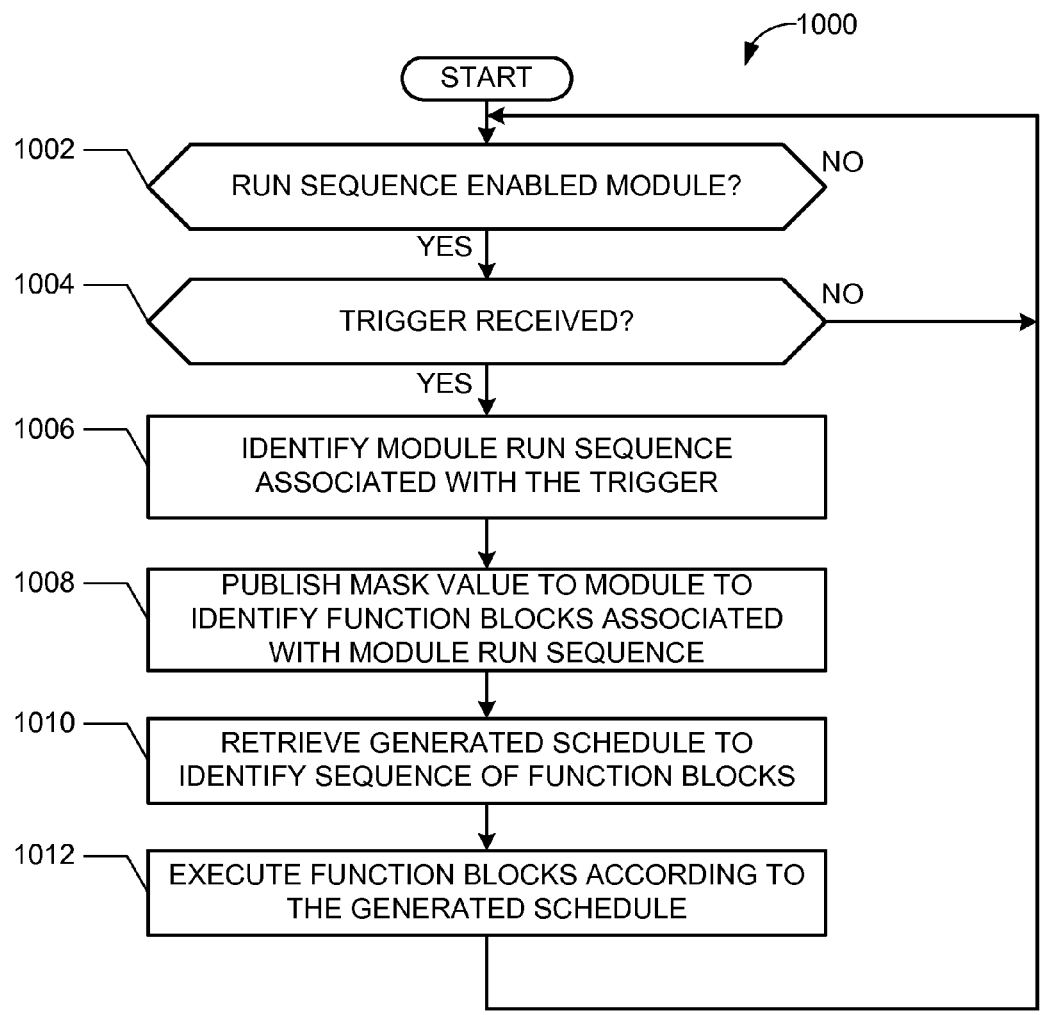

FIGS. 9 and 10 illustrate example processes that may be performed to implement the example process control system 100, 200 and module run sequence manager 152, 252 of FIGS. 1-8. The example processes of FIGS. 9 and 10 may be carried out by a processor, a controller and/or any other suitable processing device. For instance, the example processes of FIGS. 9 and 10 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform P100 discussed below in connection with FIG. 11). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 9 and 10 may be implemented using any combination(s) of ASIC(s), PLD(s), FPLD(s), discrete logic, hardware, firmware, etc. Also, one or more operations of the example processes of FIGS. 9 and 10 may instead be implemented manually or as any combination of any of the foregoing techniques, for example, any combination of firmware, software, discrete logic, and/or hardware. Further, many other methods of implementing the example operations of FIGS. 9 and 10 may be employed. For example, the order of execution of the blocks may be changed, and/or one or more of the blocks described may be changed, eliminated, sub-divided, or combined. Additionally, any or all of the example processes of FIGS. 9 and 10 may be carried out sequentially and/or carried out in parallel by, for example, separate processing threads, processors, devices, discrete logic, circuits, etc.

The example process 900 of FIG. 9 begins with the module run sequence function block definer 302 receiving a module selection (block 902), such as a module selection from a user via the example UI 600 of FIG. 6. Generally speaking, the example process 900 of FIG. 9 illustrates a manner in which MRSs can be configured to execute in the example process control systems 100 and 200 of FIGS. 1 and 2. The selected module is parsed and/or otherwise examined by the example MRS FB definer 302 to identify all of the FBs that may reside therein (block 904). As described above in connection with FIG. 3, the example MRS FB definer 302 is communicatively connected to the runtime database 134, 234, the configuration database 140, 240 and/or any other data source that may store one or more modules for use in the example process control systems 100 and 200 of FIGS. 1 and 2. Once extracted, the FBs within the selected module may be made available to the UI 600 in the event that the example browse button 612 is selected. One or more FB selections are received (e.g., via the UI 600) by the example MRS FB definer 302 and arranged in a sequence in which they are to execute (block 906). For example, the selected FBs may be listed in order of preferred execution in the example FB assignment field 610 in the UI 600 of FIG. 6. Additionally or alternatively, one or more properties of the selected FBs may be edited and/or otherwise augmented to indicate a sequence order in the event the FB is called for execution by an MRS.

The subset of FBs received are associated with an MRS identifier (block 908), such as a descriptive name for the MRS. Such MRS nomenclature may be identified in the example sequence label fields 602 of FIG. 6. As described above, each MRS may have a unique mask value assigned to it that, when compared to mask values of one or more FBs, determines whether or not the FB is associated with the MRS. For example, if an MRS is assigned a binary value of 1010, one or more FBs that are to execute in connection with the MRS will also be assigned the same binary value. Mask values for FBs may be stored as part of the parameter values that define each FB and which permit associations to be made via logical AND operations between the MRS mask value and one or more FB mask values. Additionally, the MRS is associated with a trigger (block 910) that, when activated (true) causes the MRS to execute the sequence of selected FBs. Triggers may include, but are not limited to Fieldbus™ device inputs (e.g., pumps, valves, sensors, etc.) that operate on a macrocycle, and/or non-Fieldbus™ device inputs that operate asynchronously with a cycle. Non-Fieldbus™ devices may include, but are not limited to sensors, transducers, thermocouples, control inputs and/or safety-related inputs, such as light curtains and E-stop switches. Without limitation, triggers may also include inputs from antecedent periodic activities, output(s) from other FBs and/or outputs based on antecedent module execution.

The example generated schedule manager 306 generates a schedule for the defined MRS (block 912), such as the example generated schedule 800 of FIG. 8. As shown in the illustrated example of FIG. 8, the selected/received trigger input 810 invokes a particular sequence of events based on the FBs associated with the invoked MRS. While the example generated schedule 800 of FIG. 8 is illustrated as a series of timelines and associated device and/or segment activity, the example generated schedule manager 306 may generate the schedule as an ordered table and store it in the run sequence definition database 308 (block 914).

Any number of MRSs may be created for a received module. In the event that the user chooses to create another MRS for the same selected module (block 916), control returns to block 904. Otherwise, in the event that the user chooses to select an alternate module for which to create one or more MRSs (block 918), then control returns to block 902.

The example process 1000 of FIG. 10 begins with the example MRS manager 152, 252 determining whether an active module is a run sequence enabled module (block 1002), such as a run sequence module modified by the example process 900 of FIG. 9. If not, then the example process 1000 waits for an instance where the active module is run sequence enabled, otherwise the example trigger monitor 310 determines whether one or more defined triggers is true (e.g., a switch input, a safety switch input, a flood sensor, a periodically generated input, etc.) (block 1004). If so, then the example MRS trigger manager 304 queries the example MRS definition database 308 to determine which MRS is associated with the detected trigger event (block 1006). Once the appropriate MRS is identified, the mask value associated with the identified MRS is extracted and a logical AND operation is executed to identify corresponding FBs that are to be executed with the identified MRS (block 1008).

To determine the proper sequence of operation for the identified FBs that are to be executed with the MRS, the example generated schedule manager 306 queries the example MRS definition database 308 to retrieve the stored generated schedule (block 1010). As described above, the generated schedule previously stored describes which process control devices participate in the execution of one or more FBs and specifies the order of execution of such FBs (block 1012). As shown in FIG. 8, the example generated schedule 800 may identify instances in synchronous protocol environments when to compel data to be sent to/from one or more devices (e.g., the smart device group 214), and/or the global device pool 250 via the data bus 212 or I/O bus 224 and/or may operate in connection with non-synchronous protocol environments. The generated schedule 800 also illustrates that a process control sequence may be realized in a process control system 100 having multiple and varying cycle rates for differing devices. In other words, devices that execute on a cycle, which is asynchronous with I/O devices external to the cycle (e.g., E-stop, interlock, etc.), can cooperate in a predicable and responsive manner by virtue of the associated MRS configuration of the module(s), and/or by virtue of coordinating one or more module run sequence(s) with a synchronous cycle, such as a Fieldbus™ macrocycle. After the generated schedule is executed (block 1012), control returns to block 1002 to await an instance of another run sequence enabled module.

Figure 11:
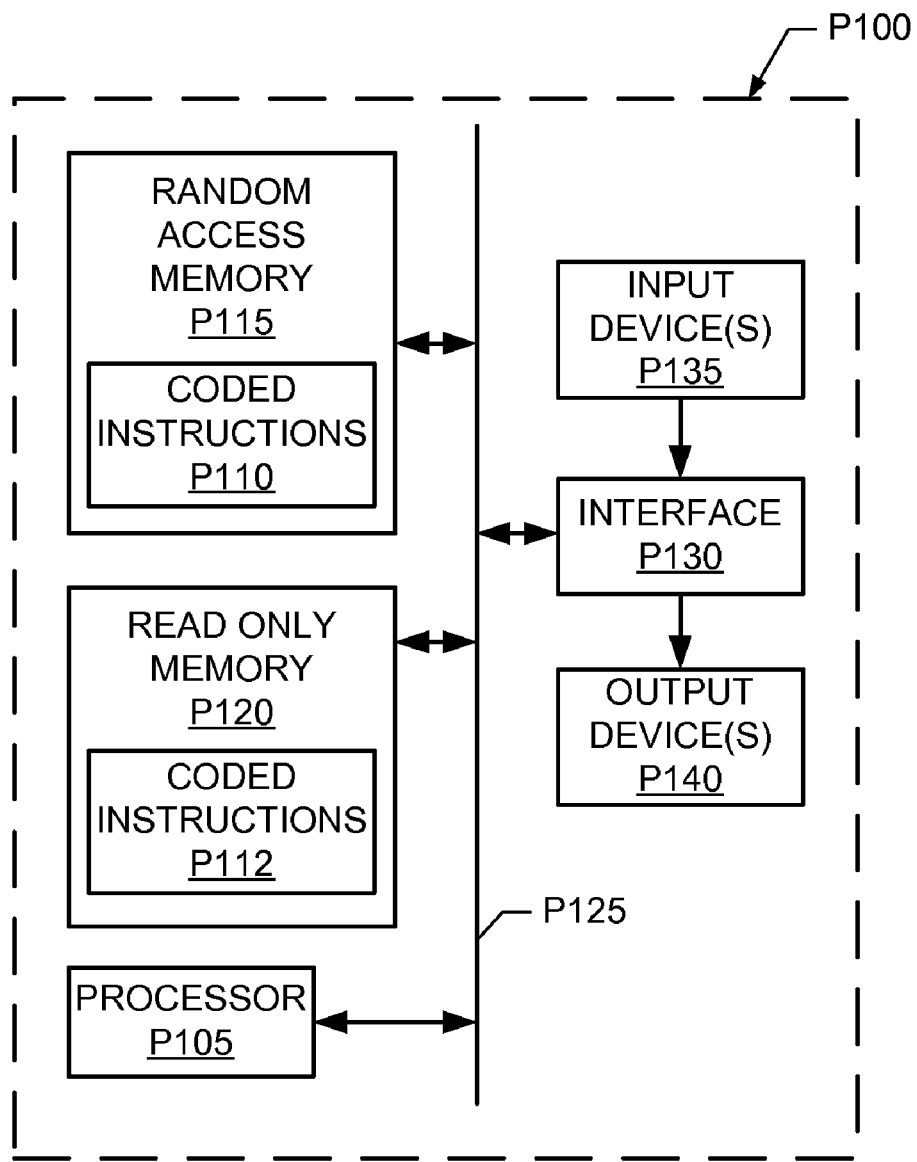
FIG. 11 is a schematic diagram of an example processor platform that may execute the example processes of FIGS. 9 and 10 and/or the example module run sequence manager of FIGS. 1-3.

FIG. 11 is a schematic diagram of an example processor platform P100 that may be used and/or programmed to implement any or all of the example runtime database 134, 234, the configuration database 140, 240, the modules 136, 236, the module run sequence manager 152, 252, the module run sequence FB definer 302, the module run sequence trigger manager 304, the generated schedule manager 306, the module run sequence definition database 308, the example modules 136, 236, the trigger monitor 310, the run sequence log manager 312, the run sequence diagnostic manager 314 and/or the run sequence structure manager 316 of FIGS. 1, 2 and 3. For example, the processor platform P100 can be implemented by one or more general-purpose processors, processor cores, microcontrollers, etc.

The processor platform P100 of the example of FIG. 11 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 9 and 10 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example runtime database 134, 234, the example configuration database 140, 240 and/or the example module run sequence definition database 308 of FIGS. 1, 2 and 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to configure a control system module run sequence, comprising:
    parsing, with a processor, a control system module to identify a plurality of function blocks therein, the control system module configured to execute entirely in response to invocation;
    selecting with the processor a first subset of the plurality of function blocks;
    generating with the processor a first sequence of execution for the module based on the first subset, wherein the first sequence of execution is different than a second sequence of execution associated with the control system module, and the first sequence of execution preventing execution of a second subset of the plurality of function blocks;
    associating with the processor the first subset with a run sequence identifier; and
    associating with the processor the run sequence identifier with a trigger condition.

2. A method as defined in claim 1, wherein the run sequence identifier comprises a mask value.

3. A method as defined in claim 2, further comprising assigning the first subset of the plurality of function blocks the mask value associated with the run sequence identifier.

4. A method as defined in claim 1, wherein the trigger condition comprises at least one of a discrete event or a periodic event.

5. A method as defined in claim 1, further comprising generating a run sequence schedule to associate the first sequence of execution with a plurality of field devices.

6. A method as defined in claim 5, wherein the run sequence schedule compels data to be transmitted on a smart device group bus independent of an execution rate associated with the module.

7. A method as defined in claim 5, wherein the run sequence schedule causes the plurality of field devices to execute at a rate independent of an execution rate associated with the module.

8. A method to execute a control system run sequence, comprising:
    identifying, with a processor, a control system module configured to execute all of a plurality of function blocks in response to invocation;
    determining a trigger condition associated with a run sequence identifier;
    monitoring a process control system for the trigger condition; and
    executing the run sequence associated with the run sequence identifier based on an instance of the trigger condition, wherein the run sequence is to invoke only a first subset of the plurality of function blocks from the control system module, and to prevent execution of a second subset of the plurality of function blocks.

9. A method as defined in claim 8, wherein executing the run sequence further comprises retrieving a run sequence schedule to identify a sequence execution order for the first subset of function blocks.

10. A method as defined in claim 9, wherein the run sequence schedule further comprises synchronizing with a cycle to compel data on a device pool comprising a plurality of process devices.

11. A method as defined in claim 10, wherein the cycle is a macrocycle associated with a fieldbus environment.

12. An apparatus to configure a module run sequence, comprising:
    a run sequence manager to parse a control system module to identify a plurality of function blocks therein, the control system module configured to execute entirely in response to invocation;
    a function block definer to select a first subset of the plurality of function blocks;
    a schedule manager to generate a first sequence of execution for the module based on the first subset of the plurality of function blocks, wherein the first sequence of execution for the subset different than a second sequence associated with the control system module, and the first sequence of execution preventing execution of a second subset of the plurality of function blocks; and
    a trigger manager to associate the first subset with a run sequence identifier and a trigger condition at least one of the run sequence manager, the function block definer, the schedule manager or the trigger manager comprising a logic circuit.

13. An apparatus as defined in claim 12, further comprising a trigger monitor to monitor a process control system for an instance of the trigger condition.

14. An apparatus as defined in claim 12, wherein the trigger manager identifies the module run sequence to execute based on the trigger condition.

15. An apparatus as defined in claim 14, wherein the schedule manager identifies the first subset of the plurality of function blocks to execute based on the identified module run sequence.

16. A tangible machine readable storage medium comprising instructions that, when executed, cause a machine to at least:
    parse a control system module to identify a plurality of function blocks therein, the control system module configured to execute entirely in response to invocation;
    select a first subset of the plurality of function blocks;
    generate a first sequence of execution for the module based on the first subset of the plurality of function blocks, wherein the first sequence of execution is different than a second sequence of execution associated with the control system module, and the first sequence of execution preventing execution of a second subset of the plurality of function blocks;
    associate the first subset with a run sequence identifier; and
    associate the run sequence identifier with a trigger condition.

17. Machine readable storage medium as defined in claim 16, wherein the instructions, when executed, cause the machine to assign the first subset of the plurality of function blocks a mask value associated with the run sequence identifier.

18. Machine readable storage medium as defined in claim 16, wherein the instructions, when executed, cause the machine to generate a run sequence schedule to associate the first sequence of execution with a plurality of field devices.

19. Machine readable storage medium as defined in claim 18, wherein the instructions, when executed, cause the machine to compel data to be transmitted on a smart device group independent of a cycle associated with the module.

* * * * *

UNITED STATES PATENT AND TRADEMARK OFFICE
CERTIFICATE OF CORRECTION

PATENT NO. : 8,229,578 B2  Page 1 of 1
APPLICATION NO. : 12/563734
DATED : July 24, 2012
INVENTOR(S) : Law et al.

It is certified that error appears in the above-identified patent and that said Letters Patent is hereby corrected as shown below:

Column 17, line 50 (claim 8), after "determining" add "with the processor"

Column 17, line 52 (claim 8), after "monitoring" add "with the processor"

Column 17, line 54 (claim 8), after "executing" add "with the processor"

Signed and Sealed this
Thirtieth Day of October, 2012

David J. Kappos
*Director of the United States Patent and Trademark Office*